United States Patent [19]

Olsen et al.

[11] 4,137,799
[45] Feb. 6, 1979

[54] ADJUSTABLE INTERLOCK HAND LEVER

[75] Inventors: Roger F. Olsen, Cuyahoga Falls; George Cantley, Akron, both of Ohio

[73] Assignee: Incom International Inc., Pittsburgh, Pa.

[21] Appl. No.: 820,491

[22] Filed: Jul. 29, 1977

[51] Int. Cl.$^2$ .................. B60K 41/04; B60K 20/00; B60K 41/02
[52] U.S. Cl. ........................... 74/876; 74/473 R; 74/483 R; 74/878; 192/0.096; 192/0.098
[58] Field of Search ............. 74/876, 878, 872, 504, 74/528, 471 R, 475, 483 R, 491, 473 R; 192/0.096, 0.098

[56] References Cited

U.S. PATENT DOCUMENTS

| | | | |
|---|---|---|---|
| 3,127,785 | 4/1964 | Morse et al. | 192/0.098 X |
| 3,511,117 | 5/1970 | Morse | 74/876 |
| 3,581,603 | 6/1971 | Farrington | 74/876 |
| 3,741,045 | 6/1973 | Kobayashi | 192/0.096 X |
| 3,842,695 | 10/1974 | Farrington et al. | 74/876 |
| 3,929,039 | 12/1975 | Karl | 74/878 |
| 4,013,155 | 3/1977 | Olsen | 192/0.096 |
| 4,034,835 | 7/1977 | Baba | 192/0.098 |

*Primary Examiner*—Leonard H. Gerin

[57] ABSTRACT

A single lever control unit for sequentially operating a transmission and throttle and, selectively, for operating the throttle independently of the transmission. A throttle shaft assembly disengages from a throttle gear by pulling out the shaft while in the neutral position. A double key on the throttle shaft disengages from a keyway in the throttle gear and a spring-loaded pin engages a cavity in the throttle gear to lock both shift and throttle gears in the neutral position. Throttle only may then be applied. When the hand lever is returned to the neutral position, the throttle shaft automatically engages the throttle gear and the locking pin automatically disengages by means of spring loading. The locking pin prevents pulling out the shaft in other than the neutral position.

A spring provides axial loading between the throttle arm connected to the shaft and a friction plate mounted on the shaft. This loading creates a frictional drag which prevents throttle creep. Additional throttle braking is achieved during throttling by means of an adjustable screw forcing a friction pad against a specially profiled side of the throttle gear.

An adjustable flange accommodates a neutral interlock lever. The flange can be angularly oriented in any desired position.

20 Claims, 8 Drawing Figures

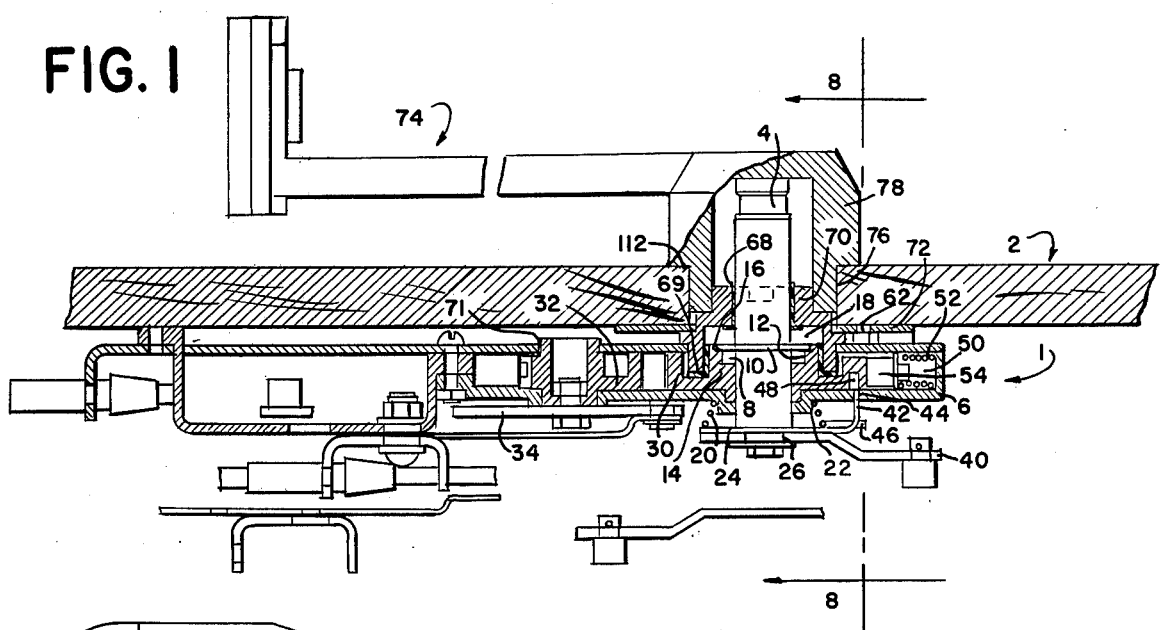
FIG. 1
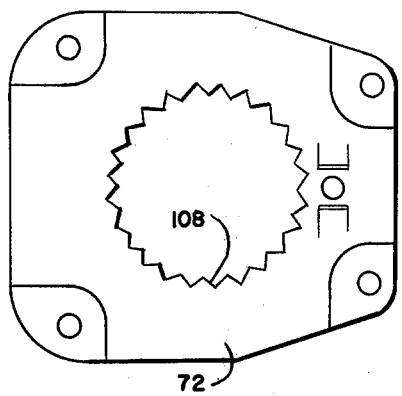
FIG. 2
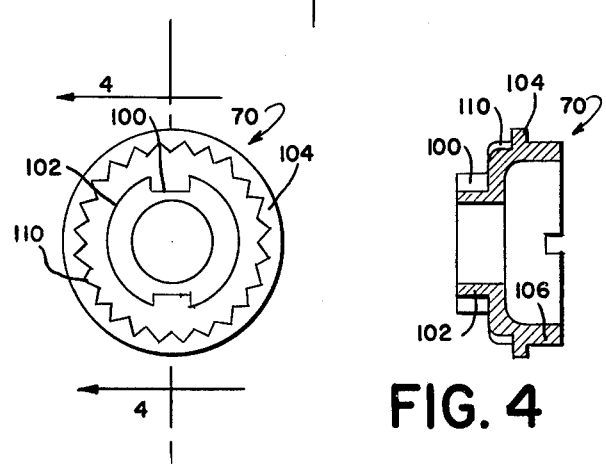
FIG. 3
FIG. 4
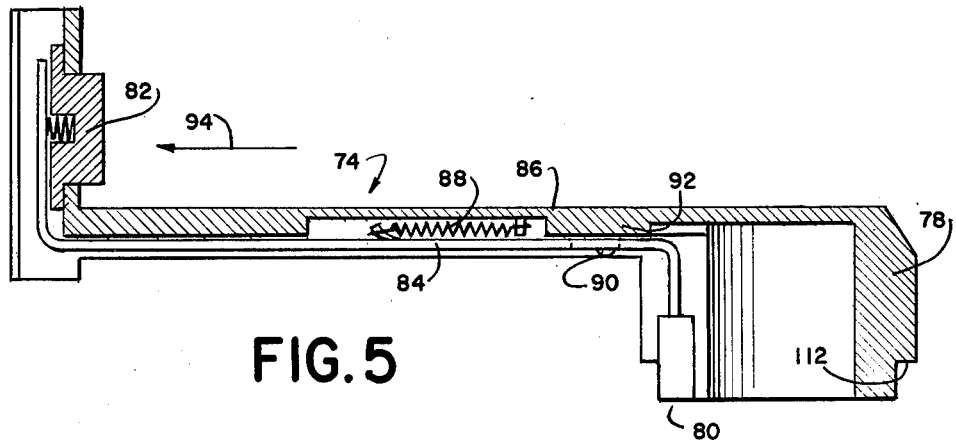
FIG. 5

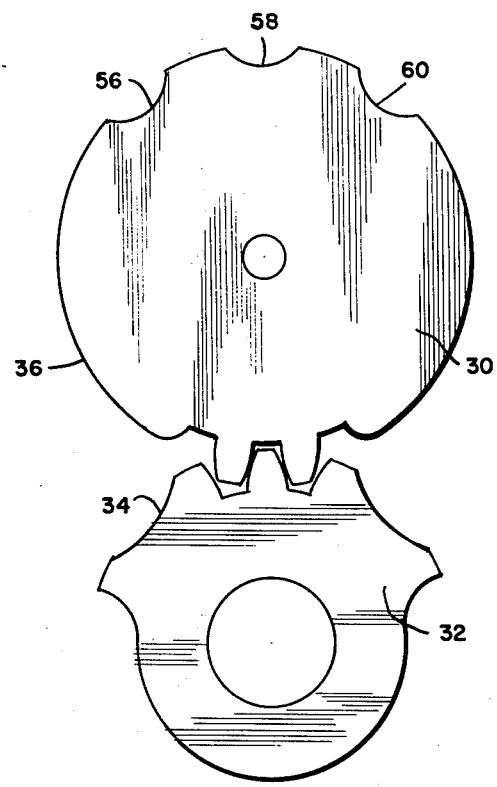
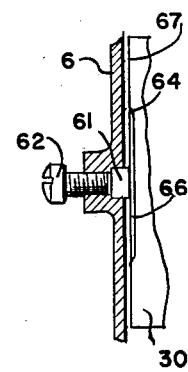
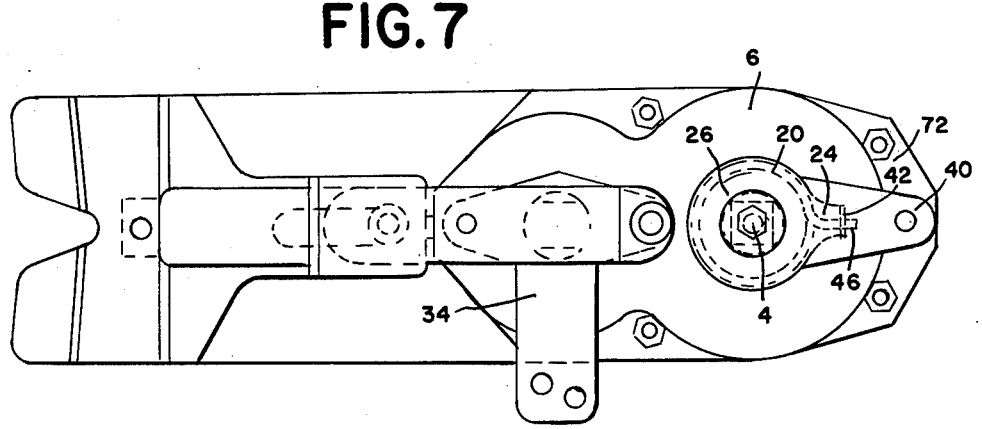

ADJUSTABLE INTERLOCK HAND LEVER

BACKGROUND OF THE INVENTION

1. Field of the Invention

This invention relates generally to interrelated motor and transmission controls and more particularly has reference to a single lever control having throttle braking in the neutral throttle mode.

2. Description of the Prior Art

Pertinent United States and foreign patents are found in Class 192, subclasses 0.096 and 0.098 and Class 74, subclasses 372, 471R, 475, 476, 483, 491, 504, 511, 519, 523, 872, 875, 876 and 878 of the official classifications of patents in the United States Patent and Trademark Office.

Examples of pertinent patents are U.S. Pat. Nos. 2,254,144; 3,127,785; 3,511,117; 3,581,603; 3,842,695 and 3,929,039.

In U.S. Pat. No. 3,842,695, the lever and shaft are not capable of axial movement, but a slider shaft in the lever assembly can be retracted. When the transmission is in the neutral position, retraction of the slider shaft disengages key 96 having projection 100 from the driving gear 56 and pulls pin 108 into hole 110. U.S. Pat. No. 3,581,603 discloses a similar mechanism. U.S. Pat. No. 3,842,695 differs from the invention in several ways: first, the lock is on the slider shaft, not the lever; second, the slider shaft is nonrotatable; third, the lock is not spring biased. In U.S. Pat. No. 3,581,603, the slider shaft is rotatable.

U.S. Pat. Nos. 3,511,117 and 3,127,785 disclose control levers which can be pulled outward when in neutral position, to open the throttle independently of the shift function. The control lever is spring biased. In U.S. Pat. No. 3,511,117, blocking flange 134 locks against reverse curved portion 133 of interlocking plate 131 to prevent accidental shift while in the neutral throttle mode. Lateral wings 135 or 136 are interposed between the blocking flange 134 and gear 38 to prevent axial translation of the control lever 18 except in the neutral position. U.S. Pat. No. 3,127,785 has a similarly functioning plate 70 and flange 37.

The lever in U.S. Pat. No. 3,929,039 contains a spring-loaded coupling shaft which can be disengaged while the lever is in a neutral position. The coupling shaft has radially extending pins 25 which couple the main shaft to the throttle gear. Pressing in the coupling shaft against the spring disengages the pins from the gear, and the gear from the shaft. In operation, this mechanism functions in the reverse manner from the invention.

No patent suggests the use of a friction plate and spring or a friction pad and profiled surface to prevent throttle creep in the neutral throttle operating mode. No patent suggests linking the friction plate to a throttle gear lock for economy of manufacture and simplicity of operation.

SUMMARY OF THE INVENTION

The present invention overcomes the problems which exist in the prior art devices. In preferred form, the invention provides a lever which permits throttle run up in neutral. A shaft to which the lever is attached is slidable along its axis. A double key on the shaft disengages from a shift gear, so that the throttle controlling-shaft may rotate without moving the shift gear. A shift gear lock and a throttle control arm are mounted on a distal end of the shaft opposite the lever. A pin at the end of the lock aligns with a notch in the face of the gear. When the lever is pulled out while in the neutral position, the keys on the shaft disengage from the gear, and the lock pin is pulled into the notch in the gear. The throttle control arm, being fixed to the shaft, is rotated, while the throttle gear is locked against rotation. The throttle shift lock is spring-loaded, the shoulder-aligned helical spring creating a frictional drag between the throttle control arm and a friction plate borne against the arm by the spring, thereby preventing throttle creep. Additional throttle braking is provided by a friction pad which bears against a specially profiled side of the throttle gear. The pad force on the gear is adjusted by a screw.

Objects of the invention are, therefore, to provide improved braking apparatus for a control unit having a shaft rotatably supported in and axially translatable with respect to a housing, one end of the shaft connected to a control member externally of the housing, translation of the member toward the housing disengaging the shaft from a drive member rotatably supported within the housing comprising, a friction plate mounted on the shaft adjacent the control member, a helical spring connected to the housing and friction plate at remote ends and surrounding the end of the shaft bounded axially by the housing and friction plate for resiliently urging the friction plate into frictional engagement with the control member, the housing is provided with an external annular shoulder concentrically spaced about the shaft, the end of the spring adjacent the housing closely circumscribing the shoulder, the control member has a relatively large radial surface adjacent the friction plate, the friction plate having a radial surface configured to abut the control member along substantially the entire radial surface of the control member, locking means connected to the friction plate for preventing rotation of the drive member when the shaft is disengaged from the drive member, the locking means comprises an axial member connected to the friction plate, the housing has a bore, the axial member received within the bore, and the drive member has a bore configured to receive the axial member projecting through the housing when aligned with the bore in the housing upon translation of the control member toward the housing, the end of the axial member closely adjacent the surface of the drive member when the bore in the drive member is moved from alignment with the bore in the housing, thereby preventing axial translation of the shaft, the axial member has an opening adjacent the friction member, and the spring means has a radial projection received within the opening in the axial member for connecting the spring means to the axial member for supporting the axial member and for resiliently urging the axial member away from the drive member when the control member is translated away from the housing, a friction pad connected to the housing adjacent the drive member, the drive member having a radial end surface configured to frictionally engage the friction pad sufficiently to provide relatively large frictional resistance to the movement of the surface across the friction pad, the surface further having portions recessed from the friction pad sufficiently to provide relatively small frictional resistance to the movement of the portions across the friction pad, a screw connected to the pad and threadedly received within the housing for varyingly urging the pad into frictional engagement with the drive member.

These and other and further objects and features of the invention are apparent in the disclosure which includes the above and below specifications and claims and drawings.

BRIEF DESCRIPTION OF THE DRAWINGS

FIG. 1 is a longitudinal cross section of a single lever control embodying the features of the present invention.

FIG. 2 is a top plan detail of the mounting flange shown in FIG. 1.

FIG. 3 is a top plan detail of the collar shown in FIG. 1.

FIG. 4 is a longitudinal cross section taken substantially along the line 4—4 of FIG. 3.

FIG. 5 is a longitudinal cross section of the hand lever shown in FIG. 1.

FIG. 6 is a top plan detail of the throttle gear and shifting gear shown in FIG. 1.

FIG. 7 is a rear plan view of the apparatus shown in FIG. 1.

FIG. 8 is a sectional detail taken substantially along the line 8—8 of FIG. 1.

DETAILED DESCRIPTION OF THE DRAWINGS

Referring to FIG. 1, a single lever control unit 1 is shown attached to a mounting board 2. Preferably, the unit is adapted to sequentially operate a transmission and throttle and, selectively, to operate the throttle independently of the transmission.

The control unit 1 has a shaft 4 mounted in a housing 6 for rotational and axial movement. The shaft 4 is provided with keys 8 adjacent an annular flange 10. The keys 8 are configured to engage keyways 12 in a hub 14 rotatably mounted in the housing 6. The flange 10 abuts an annular shoulder 16 on the hub 14 when the keys 8 and keyways 12 are engaged. The shaft 4 communicates rotary actuating forces to the hub 14 through the keys 8.

A space 18 is provided adjacent the shaft 4 above the annular flange 10 to permit axial translation of the shaft 4. When translated, the keys 8 and keyways 12 disengage, thereby permitting rotation of the shaft 4 without consequent rotation of the hub 14. The lower surface of the keys 8 abut the upper surface of the hub 14 until further rotation of the shaft 4 causes the keys 8 to realign with the keyways 12.

A spring 20 surrounds the end of the shaft 4. The upper end of the spring 20 abuts an annular shoulder 22 on the housing 6. The lower end of the spring 20 abuts a friction plate 24 mounted on the shaft 4 adjacent a throttle actuating member 26 rigidly connected to the end of the shaft 4. The spring 20 continuously urges the keys 8 and annular flange 10 on the shaft 4 toward the hub 14. This causes the keys 8 to automatically engage the keyways 12 when the shaft 4 rotates the keys 8 into alignment with the keyways 12.

The hub 14 has a throttle gear portion 30. The throttle gear 30 is a Geneva type wheel which operatively engages a Geneva wheel 32 rotatably mounted in the housing 6. The Geneva wheel 32 is rigidly connected to a shift control arm 34; the arm 34 and wheel 32 rotating simultaneously. As shown in FIG. 6, rotation of the throttle gear 30 causes rotation of the Geneva wheel shift gear 32 only when the teeth of the gears 30 and 32 are meshed. Substantial rotation of the throttle gear 30 in either direction causes the teeth of the throttle gear 30 and shift gear 32 to disengage. Continued rotation of the throttle gear 30 causes a reversed curve portion 34 of the shift gear 32 to mate with a curved surface 36 on the throttle gear 30 to prevent rotation of the shift gear 32.

The sequential shifting and throttling operations of the control unit as well as the selective independent throttling operation of the control unit can now be readily understood. The throttle control arm 40 is connected to an engine throttle operator (not shown). Similarly, the shift control arm 34 is connected to a transmission operator (not shown). The connections are made in a manner to permit neutral idling of the engine when the throttle gear 30 and shift gear 32 are aligned as in FIG. 6. Rotation of the shaft 4 in one direction rotates the throttle gear 30 in the same direction. Initially, the shift gear 32 is also rotated in the same direction. When the reversed curve portion 34 of the shift gear 32 abuts the curved portion of the throttle gear 30, the shift gear 32 stops rotating. At this point, the shifting of the transmission from neutral to an operative gear, for example, forward gear, is complete. Continued rotation of the shaft 4 causes rotation of the throttle gear 30 and throttle actuating member 26. Consequently, the engine is throttled. When the shaft 4 is rotated in the opposite direction, the throttle gear 30 and throttle actuating member 26 rotate in a similar direction. Initially, engine throttle is reduced. Continued rotation of the shaft 4 causes the teeth on the throttle gear 30 and shift gear 32 to mesh. The transmission is shifted from forward gear to neutral. If the shaft 4 is further rotated, the transmission is shifted from neutral to reverse gear. Reverse throttle is then applied by continued rotation of the shaft 4. In order to prevent throttling while the shifting gear 32 is rotating, the throttle control arm 40 is connected to the throttle operator by an appropriate lost motion device, or any similarly functioning device.

A locking arm 42 is connected to the friction plate 24 and is received within an opening 44 in the housing 6. The end 46 of the spring 20 projects through an opening in the locking arm 42 and is thereby connected to the locking arm 42. The throttle gear 30 is provided with a notch 48 configured to receive the locking arm 42 when the notch 48 is aligned with the opening 44 in the housing 6. The notch 48 is positioned to align with the opening 44 in the housing 6 when the throttle gear 30 and shift gear 32 are in neutral alignment.

Axial translation of the shaft 4 in neutral disengages the keys 8 from the keyways 12 and projects the locking arm 42 into the notch 48 in the throttle gear 30, thereby locking the throttle gear 30 and shift gear 32 in neutral position. Rotation of the shaft 4 throttles the engine. The spring 20 urges the friction plate 24 into frictional engagement with the throttle actuating member 26 to prevent throttle creep. When the shaft 4 is rotated to the neutral position, the keys 8 automatically engage the keyways 12 and the locking arm 42 automatically disengages the notch 48 in the throttle gear 32 by means of axial loading created by the spring 20. The end 46 of the spring 20 connected to the locking arm 42 facilitates removal of the arm 42 from the notch 48 in the throttle gear 30 and supports the arm 42.

When the throttle gear 30 is rotated from neutral alignment, the notch 48 in the throttle gear 30 is moved from alignment with the opening 44 in the housing 6. The locking arm 42 prevents axial translation of the shaft 4.

A detent 50 is mounted in the housing 6 adjacent the throttle gear 30. The detent has a spring 52 which continuously urges a roller 54 against the side of the throttle gear 30. The gear 30 is provided with spaced notches 56, 58 and 60 configured to receive the roller 54. The central notch 58 is positioned to receive the roller 54 when the throttle gear 30 is in neutral alignment. The side notches 56 and 60 are positioned to receive the roller 54 when the reverse curved portion 34 of the shift gears 32 is first rotated into contact with the curved portion 36 of the throttle gear 30. Engagement of the roller 54 with the notches 56, 58 and 60 tends to lock the throttle gear 30 against rotation. The operator of the control unit 1 is thereby given indications that the engine is in neutral or forward or reverse gear. Additionally, the side notches 56 and 60 are positioned to engage the roller 54 when the control unit 1, operating in sequential mode, completes the shifting operation and begins the throttling operation.

A friction pad 61 is connected to the end of a screw 62 threadedly mounted in a housing 6. As best shown in FIG. 8, the pad 61 as positioned to abut a specially profiled surface 64 of the throttle gear 30. The surface 64 has a portion 66 recessed from the friction pad 61; the arc length of the portion 66 corresponding to the amount of angular displacement of the throttle gear 30 during which the throttle gear 30 rotates the shifting gear 132. When the control unit 1 operates in the shifting mode, the friction pad 60 offers relatively little frictional resistance to the rotation of the throttle gear 30 since the friction pad 61 is aligned with the recessed portion 66 of the throttle gear 30. In the throttling mode, however, the friction pad 61 is aligned with the portion 67 of the profiled surface 64 of the gear 30 closely adjacent the inward surface of the housing 6, thereby offering a relatively large frictional resistance to the rotation of the throttle gear 30. The amount of frictional resistance offerred by the pad 61 to the rotation of the gear 30 can be adjusted by the screw 62.

It is appreciated that the control unit 1 is readily adaptable for use with power boat engines. Consequently, sleeve bearings 68, 69 and 71 are provided to seal the unit 1 and to prevent damage to the components of the unit 1 due to the environment.

An interlock collar 70 and a collar retainer 72 are connected to the control unit 1 prior to mounting the control unit 1 on the mounting surface 2. A neutral interlock hand lever 74 is connected to the end of the shaft 4 projecting through the opening 76 in the mounting surface 2. The lower end of the hand lever cap 78 surrounds a portion of the interlock collar 70 and is provided with means to lock the hand lever 74 against further rotation when the hand lever 74 is moved to a neutral position.

As shown most clearly in FIG. 5, the hand lever 74 has a block 80 slidably mounted within the cap 78. The block 80 is connected to a release button 82 by an arm 84 slidably mounted within the shaft 86 of the hand lever 74. A spring 88 connected to the arm 84 and the shaft 86 urges the block 80 toward the center of the cap 78. A screw 90 projects through a slot in the arm 84 and is received within a sliding block 92 formed inside the shaft 86 to keep the arm 84 in proper alignment. Moving the button 82 in the direction indicated by the numeral 94 slides the block 80 toward the side of the cap 78. When the button 82 is released, the spring 88 causes the block 80 to automatically move toward the center of the cap 78.

The cap 78 is positioned on the collar 70 in a manner which enables the radially inward surface of the block 80 to abut the radially outward surface of the upper axial portion 102 of the collar 70. The cap 78 is connected to the shaft 4 and rotates with the shaft 4. Rotation of the shaft 4 causes the block 80 to move along the surface 102 of the collar 70. A notch 100 provided in the upper axial portion 102 of the collar 70 is configured to receive the block 80 when the block 80 is aligned with the notch. Preferably, the notch 100 is positioned to engage the block 80 when the hand lever 74 and shaft 4 are rotated to a neutral position. Engagement of a block 80 and notch 100 prevents further rotation of the hand lever 74 and shaft 4.

Moving the button 82 in the direction indicated by numeral 94 moves the block 80 toward the side of the cap 78, thereby disengaging the block 80 and the notch 100. The hand lever 74 and shaft 4 can then be rotated from the neutral position. When the hand lever 74 and shaft 4 are returned to the neutral position, the spring 88 causes the block 80 to automatically engage the notch 100 thereby automatically preventing further rotation of the hand lever 74 and shaft 4.

The collar 70 is held against the housing 6 by the retainer 72 which overlies an annular flange 104 on the lower axial portion 106 of the collar 70. The retainer 72 is provided with serrations 108 configured to engage serrations 110 on the lower axial portion 106 of the collar 70 adjacent the flange 104. The serrations 108 and 110 prevent rotation of the collar 70 when engaged. Prior to mounting the control unit 1 on the mounting plate 2, the collar 70 is oriented in the retainer 72 in any desired position. Preferably, the collar 70 is oriented in a manner which positions the interlock notch 100 to engage the block 80 when the hand lever 74 is in an appropriate neutral orientation.

Cap 78 is provided with an annular shoulder 112 which abuts the outward surface of the mounting board 2 when the keys 8 on the shaft 4 engage the keyways 12 in the hub 14. When the shaft 4 is translated axially to disengage the keys 8 and keyways 12, the shoulder 112 is spaced from the surface of the mounting board 2 thereby providing an indication to the operator that the control unit 1 is in the neutral throttle mode of operation.

In an alternative embodiment, the cap 78 is positioned on the collar 70 in a manner which enables the axially inward surface of the block 80 to abut the axially outward end of the upper axial portion 102 of the collar 70 when the hand lever 74 is rotated from the neutral position while the control unit 1 is in the neutral throttle mode of operation. When the hand lever 74 is rotated to the neutral position, the block 80 engages the notch 100, thereby permitting axial translation of the shaft 4 and engagement of the keys 8 with the keyways 12 under loading from the spring 20. The hand lever 74 is rotated from the neutral position in the manner previously described.

While the invention has been described with reference to a specific embodiment, the exact nature and scope of the invention is defined in the following claims.

What is claimed is:

1. Braking apparatus for a control unit having a shaft rotatably supported in a housing, one end of the shaft connected to a control member externally of the housing comprising, a friction member mounted on the shaft adjacent the control member, and spring means positioned to abut the housing and friction member for resiliently urging the friction member into frictional engagement with the control member.

2. The apparatus of claim 1 wherein the spring means is connected to the housing and friction member.

3. The apparatus of claim 1 wherein the spring means comprise a helical spring surrounding the end of the shaft, the housing and friction member abutting the spring at remote ends.

4. The apparatus of claim 1 wherein the friction member comprises a plate.

5. The apparatus of claim 1 wherein the spring means comprise a helical spring surrounding the end of the shaft, the housing and friction member connected to the spring at remote ends.

6. The apparatus of claim 1 wherein the control member has a relatively large radial surface adjacent the friction member, the friction member comprising a plate having a radial surface configured to abut the control member along substantially the entire radial surface of the control member.

7. The apparatus of claim 3 wherein the spring surrounds the portion of the shaft bounded axially by the housing and the friction member.

8. The apparatus of claim 3 wherein the housing is provided with an external shoulder concentrically spaced about the shaft, the end of the spring adjacent the housing closely circumscribing the shoulder.

9. The apparatus of claim 8 wherein the shoulder is an annular shoulder.

10. Braking apparatus for a control unit having a shaft rotatably supported in and axially translatable with respect to a housing, one end of the shaft connected to a control member externally of the housing, translation of the member toward the housing disengaging the shaft from a driven member positioned within the housing comprising,
    a friction member mounted on the shaft adjacent the control member,
    spring means positioned to abut the housing and friction member for resiliently urging the friction member into frictional engagement with the control member, and
    locking means connected to the friction member for preventing rotation of the driven member when the shaft is diesengaged from the driven member.

11. The apparatus of claim 10 wherein the locking means comprises an axial member connected to the friction member,
    the housing has a bore, the axial member received within the bore, and
    the driven member has a bore configured to receive the axial member projecting through the housing when aligned with the bore in the housing upon translation of the control member toward the housing,
    the end of the axial member closely adjacent the surface of the driven member when the bore in the driven member is moved from alignment with the bore in the housing, thereby preventing axial translation of the shaft.

12. The apparatus of claim 10 wherein the spring means is connected to the locking means for supporting the locking means and for resiliently urging the locking means away from the driven member when the control member is translated away from the housing.

13. The apparatus of claim 11 wherein the spring means is connected to the axial member adjacent the friction member for supporting the axial member and for resiliently urging the axial member away from the driven member when the control member is translated away from the housing.

14. The apparatus of claim 13 wherein the axial member has an opening adjacent the friction member, and
    the spring means has a radial projection received within the opening in the axial member for connecting the spring means to the axial member.

15. Braking apparatus for a control unit having a drive member rotatably supported in a housing comprising,
    a friction member connected to the housing adjacent the drive member,
    the drive member having a surface configured to frictionally engage the friction member sufficiently to provide relatively large frictional resistance to the movement of the surface across the friction member,
    the surface further having portions recessed from the friction member sufficiently to provide relatively small frictional resistance to the movement of the portions across the friction member.

16. The apparatus of claim 12 further comprising adjusting means connected to the housing and friction member for varyingly urging the friction member into frictional engagement with the drive member.

17. The apparatus of claim 12 wherein the friction member comprises a friction pad.

18. The apparatus of claim 12 wherein the surface is a radial end surface of the drive member.

19. The apparatus of claim 14 further comprising a screw connected to the pad and threadedly received within the housing for varyingly urging the pad into frictional engagement with the drive member.

20. Braking apparatus for a control unit having a shaft rotatably supported in a housing, one end of the shaft connected to a control member externally of the housing and having a drive member rotatably supported in the housing comprising,
    a first friction member mounted on the shaft adjacent the control member,
    spring means positioned to abut the housing and friction member for resiliently urging the friction member into frictional engagement with the control member,
    a second friction member connected to the housing adjacent the drive member,
    the drive member having a surface configured to frictionally engage the friction member sufficiently to provide relatively large frictional resistance to the movement of the surface across the friction member,
    the surface further having portions recessed from the friction member sufficiently to provide relatively small frictional resistance to the movement of the portions across the friction member.

* * * * *

UNITED STATES PATENT AND TRADEMARK OFFICE
CERTIFICATE OF CORRECTION

PATENT NO. : 4,137,799
DATED : February 6, 1979
INVENTOR(S) : Roger F. Olsen and George Cantley It is certified that error appears in the above-identified patent and that said Letters Patent are hereby corrected as shown below:

In Figure 6 "34" should be --34'--.

Column 4, line 1 and line 17 "34" should be --34'--.

Column 5, line 27 "60" should be --61--.

Claim 16, line 1 (Column 8, line 28) "12" should be --15--.

Claim 17, line 1 (Column 8, line 32) "12" should be --15--.

Claim 18, line 1 (Column 8, line 34) "12" should be --15--.

Claim 19, line 1 (Column 8, line 36 "14" should be --17--.

Claim 20, line 8 (Column 8, line 48) --the first-- should be inserted after "and";

line 14 (Column 8, line 55) --second-- should precede "friction";

line 19 (Column 8, line 60) --second should precede "friction".

Signed and Sealed this

Seventeenth Day of November 1981

[SEAL]

Attest:

GERALD J. MOSSINGHOFF

Attesting Officer    Commissioner of Patents and Trademarks